UNITED STATES PATENT OFFICE.

BENJAMIN F. FAY, OF PACIFIC, MISSOURI.

CLEANING AND POLISHING BRICK.

SPECIFICATION forming part of Letters Patent No. 429,090, dated May 27, 1890.

Application filed February 19, 1890. Serial No. 341,067. (No specimens.)

*To all whom it may concern:*

Be it known that I, BENJAMIN F. FAY, of Pacific, in the county of Franklin and State of Missouri, have invented a new and useful Cleansing and Polishing Brick, of which the following is a full, clear, and exact description.

My invention consists of a compound or composition of a clay known as "kaolin" with water and tripoli, in the proportions hereinafter set out, either in the form of a powder or pressed into bricks or blocks and burned in kilns, in the manner hereinafter shown.

Tripoli has been utilized for polishing purposes, and its utility for this purpose in its crude form is not here claimed as a discovery; but it has not been used as a constituent of the composition of matter herein described or in the form of the brick or block proposed to be made out of this composition. This brick or block, when prepared by the process herein described, furnishes a new and useful material for polishing all cold metals—glass, marble, stone, and wood. It is an absorbent, and will remove grease from wood, stone, and other porous surfaces or substances.

The elements of this composition are as follows, viz: first, water; second, kiln-dried kaolin ground to the fineness of eighty (80) meshes to the square inch, or No. 16 bolting-cloth; third, kiln-dried tripoli ground to the fineness of eighty (80) meshes to the square inch, or No. 16 bolting-cloth. These materials are to mixed in the following proportions, viz: To one pound of dried and ground kaolin add three pounds of water and mix thoroughly, and to this add one hundred pounds of ground tripoli and mix until the whole is thoroughly incorporated, and in the same proportion for any quantity—that is to say, to one part of kaolin add three of water and one hundred of tripoli. Sift the material thus prepared through a one-half-inch-mesh screen and press it into bricks or blocks by what is called the "dry-press process." Off-bear direct to the kiln, and set in the usual manner for stock-brick; but take the precaution to set the benches only fifteen courses high each twelve hours, thereby giving the cement of the tripoli and kaolin time to set and harden, the process of hardening being similar to that of Portland cement.

The burning or baking is accomplished by the use of a downdraft kiln so constructed as to avoid discoloration of the brick by the raw flame. The construction of this kiln is as follows, viz: A round downdraft kiln having an inner and an outside wall, the flues of which pass up on the outside of the kiln from each quarter to a man-hole in the top. The flame from each flue, coming in contact with the flame of the other at the man-hole, consumes the gases of each, producing a deoxygenated flame or generated heat, which is diffused from this point through an air-chamber to the brick, or by which heat the bricks are baked without introducing directly the raw flame of the fuel. This produces a cream-white brick free from marks or discoloration and of the proper consistency for cleansing and polishing.

The cleansing qualities of this composition render it superior to any of its class, and it is presented to the commercial world in the most useful and convenient form.

What I claim as my invention, and desire to secure by Letters Patent, is—

As a new article of manufacture, a cleaning and polishing body, brick, or block, comprising one part of kaolin, three parts of water, and one hundred parts of tripoli, manufactured substantially as described.

BENJAMIN F. FAY.

Attest:
  THOMAS B. CREWS,
  A. M. SULLIVAN.